(12) United States Patent
Fetvedt (10) Patent No.: US 12,467,631 B2
(45) Date of Patent: Nov. 11, 2025

(54) SYSTEMS AND METHODS FOR CONTROL OF VOLUMETRIC FLOWS IN A POWER PRODUCTION PLANT

(71) Applicant: 8 Rivers Capital, LLC, Durham, NC (US)

(72) Inventor: Jeremy Eron Fetvedt, Raleigh, NC (US)

(73) Assignee: 8 RIVERS CAPITAL, LLC, Durham, NC (US)

(*) Notice: Subject to any disclaimer, the term of this patent is extended or adjusted under 35 U.S.C. 154(b) by 0 days.

(21) Appl. No.: 18/821,561

(22) Filed: Aug. 30, 2024

(65) Prior Publication Data

US 2024/0418371 A1 Dec. 19, 2024

Related U.S. Application Data

(62) Division of application No. 18/011,450, filed as application No. PCT/IB2021/055771 on Jun. 28, 2021, now Pat. No. 12,203,658.

(60) Provisional application No. 63/045,528, filed on Jun. 29, 2020.

(51) Int. Cl.
*F23R 3/28* (2006.01)
*F02C 9/26* (2006.01)
*F02C 9/28* (2006.01)
*F02C 9/48* (2006.01)

(52) U.S. Cl.
CPC .............. *F23R 3/28* (2013.01); *F02C 9/26* (2013.01); *F02C 9/28* (2013.01); *F02C 9/48* (2013.01); *F05D 2270/053* (2013.01)

(58) Field of Classification Search
CPC ................. F02C 3/34; F02C 9/24; F02C 9/48
See application file for complete search history.

(56) References Cited

U.S. PATENT DOCUMENTS

| | | |
|---|---|---|
| 8,596,075 B2 | 12/2013 | Allam et al. |
| 8,776,532 B2 | 7/2014 | Allam et al. |
| 8,869,889 B2 | 10/2014 | Palmer et al. |
| 8,959,887 B2 | 2/2015 | Allam et al. |
| 8,986,002 B2 | 3/2015 | Palmer et al. |
| 9,062,608 B2 | 6/2015 | Allam et al. |
| 9,068,743 B2 | 6/2015 | Palmer et al. |
| 10,103,737 B2 | 10/2018 | Fetvedt et al. |
| 10,794,274 B2 | 10/2020 | Itoh et al. |

(Continued)

FOREIGN PATENT DOCUMENTS

JP 20140149254 2/2016

*Primary Examiner* — Scott J Walthour
(74) *Attorney, Agent, or Firm* — Womble Bond Dickinson (US) LLP (57) ABSTRACT

The present disclosure provides methods for controlling volumetric flows of streams into a combustor, and particularly in a combustor utilized in a power production method. A controller can be used to receive a variety of inputs, carry out calculations, and output one or more signals that adjust one or more parameters of one or more of the streams entering the combustor. Such adjustments can be effective to normalize a volumetric flow rate between the combustor and a turbine immediately downstream from the combustor without requiring direct measurement of the volumetric flow rate between the combustor and the turbine immediately downstream from the combustor.

6 Claims, 3 Drawing Sheets

(56) References Cited

U.S. PATENT DOCUMENTS

| | | | |
|---|---|---|---|
| 2001/0000049 A1* | 3/2001 | Kataoka | F02C 3/34 |
| | | | 60/775 |
| 2016/0010493 A1 | 1/2016 | O'Dea et al. | |
| 2017/0248083 A1* | 8/2017 | Fetvedt | F01K 13/00 |
| 2018/0058335 A1 | 3/2018 | Alexander et al. | |
| 2019/0128183 A1 | 5/2019 | Morii et al. | |

* cited by examiner

SYSTEMS AND METHODS FOR CONTROL OF VOLUMETRIC FLOWS IN A POWER PRODUCTION PLANT

CROSS-REFERENCE TO RELATED APPLICATIONS

This application is a divisional of U.S. application Ser. No. 18/011,450, filed Dec. 19, 2022, which is a U.S. National Stage of International Patent Application PCT/IB2021/055771, filed Jun. 28, 2021, and claims priority to U.S. Provisional Patent Application No. 63/045,528, filed Jun. 29, 2020, which applications are hereby incorporated in their entirety by reference in this application

FIELD OF THE DISCLOSURE

The present disclosure relates to systems and methods for controlling operation of a power production plant. More particularly, the systems and methods can be useful for controlling volumetric flow rate(s) of one or more streams in a power production plant.

BACKGROUND

As the demand for electrical power production increases there is a continuing need for power production plants to meet such needs. Because of market demands, it is desirable for such power production to be achieved with the greatest possible efficiency; however, growing requirements for carbon capture have required technological advances. For example, U.S. Pat. No. 8,596,075 to Allam et al., the disclosure of which is incorporated herein by reference, provides for desirable efficiencies in oxy-fuel combustion systems utilizing a recycle $CO_2$ stream wherein the $CO_2$ is captured as a relatively pure stream at high pressure. Although systems and methods incorporating a recycle $CO_2$ stream are known, it can still be difficult to provide for precise control of various flows in the overall system. In particular, variations in the power output of such systems can lead to significant changes in the volumetric flows through the system, and it can be difficult to account for such flow changes in known systems. Accordingly, there remains a need in the art for further means for operation of a power production plant such that variations in power output may be carried out without significant changes in the volumetric flows through the power production plant.

SUMMARY OF THE DISCLOSURE

The present disclosure relates to systems and methods for power production. The systems and methods can be effective to achieve improved control over one or more aspects of the power production including, but not limited to, controlling a volumetric flow rate of one or both of a fuel stream and an oxidant stream into a combustor. Such control can be effective to normalize a volumetric flow rate of a combustor exhaust stream passing between a combustor and a turbine. Further, controls provided according to the present disclosure can be effective in controlling the speed of the fuel and/or oxidant passing through one or more nozzles and/or injection holes, thereby allowing a larger operational envelope for the combustion process to occur. Moreover, this can be provided without the need for other methods, such as high and low range injection ports.

One or more control functions according to the present disclosure can be effective for modification of the chemistry of one or more streams in the power production plant, and particularly for modification of the chemistry of one or both of the fuel stream and the oxidant stream entering the combustor. In so doing, it is possible according to the disclosure to control the volumetric flow rates into the combustion chamber (e.g., through improved control of fuel and/or oxidant flow speed through injection components) and thus control the volumetric flow rate of the combustor exhaust stream exiting the combustor. While such parameters are typically quite difficult to measure in a power production plant, the present disclosure makes use of a proxy for the volumetric flow rate. For example, a pressure differential across one or more elements of the power production plant can be utilized. In some embodiments, a pressure differential between a fuel nozzle entering the combustor and the combustor exhaust stream may be used. In some embodiments, a pressure differential between an oxidant nozzle entering the combustor and the combustor exhaust stream may be used. The measured values may be input to one or more functions whereby computer calculations can be used to increase or decrease the amount of a diluent (e.g., $CO_2$) that may be input to a fuel stream and/or an oxidant stream and thereby modify the stream chemistry. As such, the stream volumetric flow rate may remain substantially constant while the relative concentration of, for example, fuel in the fuel stream or oxidant (e.g., oxygen) in the oxidant stream can fluctuate. A parameter may be considered to be "substantially constant" when the parameter changes over time by no more than 10%, no more than 5%, no more than 2%, no more than 1%, or no more than 0.5%, any of which may be chosen.

The presently disclosed systems and methods go against conventional teaching in the art. For example, in a typical gas turbine, it can be difficult or impossible to provide effective control over the oxidant chemistry entering the combustor. Moreover, in typical gas turbines, combustion nozzles are designed for a narrow range of Wobbe index values with deviation from this narrow range during operation being unacceptable. The present disclosure overcomes difficulties in relation to structural limitations on Wobbe index values allowable for an individual component of the system by directly changing the Wobbe value of the fuel stream entering the combustor. This in turn can provide for improved control of further aspects of the combustion process.

In one or more embodiments, the present disclosure particularly can provide methods for controlling a volumetric flow rate of a combustor inlet or exit stream. For example, such methods can comprise: providing one or more signals to a controller, the one or more signals being indicative of one or more parameters of: one or more streams entering a combustor; an exhaust stream exiting the combustor; or one or more streams entering the combustor and an exhaust stream exiting the combustor; calculating, using the controller, a factor effective for adjusting the volumetric flow rate of the combustor inlet or exit stream; and outputting from the controller one or more output signals effective to implement the factor and adjust the volumetric flow rate of the combustor inlet or exit stream so that a volumetric flow rate between the combustor and a turbine immediately downstream from the combustor is controlled within a defined range without direct measurement of the volumetric flow rate between the combustor and the turbine immediately downstream from the combustor. In further embodiments, such methods can be further defined in relation to one or more of the following statements, which statements can be combined in any number and/or order.

The step of providing one or more signals to the controller can comprise providing a signal corresponding to a mass flow of a fuel stream at a point that is immediately upstream of a fuel inlet to the combustor.

The step of providing one or more signals to the controller can comprise providing a signal corresponding to a pressure of the exhaust stream exiting the combustor.

The step of providing one or more signals to the controller can comprise providing a signal corresponding to a pressure of an oxidant stream at a point that is immediately upstream of an oxidant inlet to the combustor.

The step of calculating can comprise calculating a factor for normalizing volumetric flow of an oxidant into the combustor.

The step of calculating can be based at least in part on a constant that is a mass flow of a fuel stream immediately upstream of a fuel inlet to the combustor that is required for full load operation of the combustor.

The step of calculating can be based at least in part on a constant that is a differential of a pressure of an oxidant stream at a point that is immediately upstream of an oxidant inlet to the combustor and a pressure of the exhaust stream exiting the combustor, said pressures being pressures required for full load operation of the combustor.

The factor that is calculated can be used to adjust a ratio of oxygen to carbon dioxide in an oxidant stream entering the combustor.

The step of calculating can comprise calculating a factor for normalizing volumetric flow of fuel into the combustor.

The controller can be configured to calculate a pressure drop through a fuel nozzle into the combustor.

The pressure drop through the fuel nozzle can be calculated based on at least a signal corresponding to a pressure of the exhaust stream exiting the combustor and a signal corresponding to a pressure of a fuel stream entering the fuel nozzle.

The factor that is calculated can be used to adjust a ratio of carbon dioxide to fuel in a fuel stream entering the combustor.

In further embodiments, the present disclosure can provide methods for power production. For example, such methods can comprise: passing a plurality of streams into a combustor so that a fuel is combusted with an oxidant in the combustor in the presence of a carbon dioxide diluent to form a combustor exhaust stream; expanding the combustor exhaust stream in a turbine to generate power at a desired output and provide a turbine exhaust stream; processing the turbine exhaust stream to isolate carbon dioxide therefrom and provide the carbon dioxide diluent; and modifying a chemistry of at least one of the plurality of streams passing into the combustor as the desired output of power generated by the turbine increases or decreases such that a total volumetric flow rate of the plurality of streams into the combustor varies by no more than 10% as the desired output of power generated by the turbine increases or decreases. In further embodiments, such methods can be further defined in relation to one or more of the following statements, which statements can be combined in any number and/or order.

The step of modifying the chemistry of the at least one of the plurality of streams passing into the combustor can include inputting to a controller one or more control inputs indicative of the increase or decrease in the desired output of power generated by the turbine.

The step of passing a plurality of streams into the combustor can include passing a fuel stream into the combustor, and wherein modifying the chemistry of the at least one of the plurality of streams passing into the combustor includes inputting to a controller a signal corresponding to a mass flow of the fuel stream at a point that is immediately upstream of an inlet of the fuel stream to the combustor.

The step of modifying the chemistry of the at least one of the plurality of streams passing into the combustor can include outputting from the controller a signal effective to increase or decrease a flow of the carbon dioxide diluent into the fuel stream upstream from the combustor The step of passing a plurality of streams into the combustor can include passing an oxidant stream into the combustor, and wherein modifying the chemistry of the at least one of the plurality of streams passing into the combustor includes inputting to a controller a signal corresponding to a pressure of the oxidant stream at a point that is immediately upstream of an inlet of the oxidant stream to the combustor.

The step of modifying the chemistry of the at least one of the plurality of streams passing into the combustor can include outputting from the controller a signal effective to increase or decrease a flow of the carbon dioxide diluent into the oxidant stream upstream from the combustor.

In still further embodiments, the present disclosure can provide power production systems. In an example embodiment, such system can comprise: a combustor operational to output a heated, pressurized combustor exhaust stream; a turbine positioned downstream from the combustor and operational to expand the heated, pressurized combustor exhaust stream to provide a turbine exhaust stream; a $CO_2$ flow line positioned downstream from the turbine, the flow line having a recycle carbon dioxide stream passing therethrough; a fuel flow line configured for passage of a fuel to the combustor; an oxidant flow line configured for passage of an oxidant to the combustor; and at least one controller. The controller in particular can be configured to receive one or more inputs, carry out one or more calculations effective to generate a normalizing factor, and use the normalizing factor to adjust one or more flows in one or more lines of the system. For example, the controller can be configured to adjust flow of carbon dioxide from the $CO_2$ flow line to one or both of the fuel flow line and the oxidant flow line. The controller particularly may be configured so that the adjustments directed by the controller can cause a volumetric flow of the heated, pressurized combustor exhaust stream output from the combustor to vary by no more than 10% during operation of the power production system.

DETAILED DESCRIPTION OF THE DISCLOSURE

The present invention now will be described more fully hereinafter. This invention may, however, be embodied in many different forms and should not be construed as limited to the embodiments set forth herein; rather, these embodiments are provided so that this disclosure will be thorough and complete, and will fully convey the scope of the invention to those skilled in the art. As used in this specification and the claims, the singular forms "a," "an," and "the" include plural referents unless the context clearly dictates otherwise The present disclosure provides systems and methods useful for power production. More particularly, the presently disclosed systems and methods provide for control of a power production plant so that volumetric flow rate into a combustor can be maintained substantially constant (e.g., within a defined variance range as described herein) regardless of changes to power output from the power production plant that would otherwise be expected to cause significant variations in the volumetric flow rate into the combustor.

Control systems and methods according to the present disclosure can be utilized in relation to a wide variety of power production systems. For example, the control elements described herein can be applied to one or more systems wherein a fuel is combusted for heating a stream that may or may not be pressurized above ambient pressure. The control elements likewise can be applied to one or more systems wherein a working fluid is circulated for being repeatedly heated and cooled and/or for being repeatedly pressurized and expanded. Such working fluid can comprise one or more of $H_2O$, $CO_2$, and $N_2$, for example.

Examples of power production systems and methods wherein control elements as described herein can be implemented are disclosed in U.S. Pat. No. 9,068,743 to Palmer et al., U.S. Pat. No. 9,062,608 to Allam et al., U.S. Pat. No. 8,986,002 to Palmer et al., U.S. Pat. No. 8,959,887 to Allam et al., U.S. Pat. No. 8,869,889 to Palmer et al., U.S. Pat. No. 8,776,532 to Allam et al., and U.S. Pat. No. 8,596,075 to Allam et al, the disclosures of which are incorporated herein by reference. As a non-limiting example, a power production system with which control elements as presently described may be utilized can be configured for combusting a fuel with $O_2$ in the presence of a $CO_2$ circulating fluid in a combustor, preferably wherein the $CO_2$ is introduced at a pressure of at least about 8 MPa, at least about 10 MPa, or at least about 12 MPa and a temperature of at least about 400° C., at least about 500° C., or at least about 600° C. to provide a combustion product stream comprising $CO_2$, preferably wherein the combustion product stream has a temperature of at least about 600° C., at least about 700° C., or at least about 800° C. Such power production system further can be characterized by one or more of the following statements, which can be utilized singly or in any combination of any two, three, four, five, etc. of the statements, up to and including all of the following statements.

The combustion product stream can be expanded across a turbine with a discharge pressure of about 1 MPa or greater to generate power and provide a turbine discharge steam comprising $CO_2$.

The turbine discharge stream can be passed through a heat exchanger unit to provide a cooled discharge stream.

The cooled turbine discharge stream can be processed to remove one or more secondary components other than $CO_2$ to provide a purified discharge stream. The purified discharge stream can comprise $CO_2$ or may be predominately $CO_2$ or may consist of $CO_2$. More particularly, the purified discharge may comprise at least 95% by weight, at least 98% by weight, at least 99% by weight, or at least 99.9% by weight $CO_2$.

The purified discharge stream can be compressed to provide a supercritical $CO_2$ circulating fluid stream.

The supercritical $CO_2$ circulating fluid stream can be cooled to provide a high density $CO_2$ circulating fluid (preferably wherein the density is at least about 200 kg/m³).

The high density $CO_2$ circulating fluid can be pumped to a pressure suitable for input to the combustor.

The pressurized $CO_2$ circulating fluid can be heated by passing through the heat exchanger unit using heat recuperated from the turbine discharge stream.

All or a portion of the pressurized $CO_2$ circulating fluid can be further heated with heat that is not withdrawn from the turbine discharge stream (preferably wherein the further heating is provided one or more of prior to, during, or after passing through the heat exchanger).

The heated pressurized $CO_2$ circulating fluid can be recycled into the combustor (preferably wherein the temperature of the heated, pressurized $CO_2$ circulating fluid entering the combustor is less than the temperature of the turbine discharge stream by no more than about 50° C.).

In addition to the foregoing, the present power production systems and methods may be particularly characterized in that a portion of the purified discharge stream (i.e., a predominately $CO_2$ stream) may be routed from any point to be used as a diluent for the fuel stream that is delivered to the combustor, as a diluent for the oxidant stream that is delivered to the combustor, or as a diluent for both of the fuel stream and the oxidant stream. The amount of diluent that is delivered independently to the fuel stream and the oxidant stream can be controlled by one or more controllers as otherwise described herein, and such controls can specifically be configured to normalize the volumetric flow rate of all streams into the combustor.

Control elements according to the present disclosure can be defined by one or more functions wherein a parameter (e.g., a measured parameter and/or a calculated parameter) can be linked to one or more executable actions. The executable actions can include one or more actions that regulate a flow of a fluid in the system, such as through opening and closing of one or more valves. As non-limiting examples, measured parameters in a control system according to the present disclosure can include a fluid flow rate, a pressure, a temperature, a liquid level, a fluid volume, a fluid composition, and the like. A measured parameter can be measured using any suitable device, such as thermocouples, pressure sensors, transducers, optical detectors, flow meters, analytical equipment (e.g., UV-VIS spectrometers, IR spectrometers, mass spectrometers, gas chromatographs, high performance liquid chromatographs, and the like), gauges, and similar devices. Calculated parameters in a control system according to the present disclosure can include, for example, power consumption of a compressor (e.g., a $CO_2$ compressor), power consumption of a pump (e.g., a $CO_2$ pump), power consumption of a cryogenic oxygen plant, fuel heat input, a pressure drop (e.g., a pressure drop in a heat exchanger) for one or more fluid streams, a temperature differential (e.g., a temperature difference at a heat exchanger hot end and/or heat exchanger cold end), a turbine power output, a generator power output, and system efficiency. A calculated parameter may be calculated, for example, by a computerized supervisory control system based on measured parameters. In some embodiments, control elements of the present disclosure can particularly relate to measured or calculated pressures at one or more points of the power production plant, and particularly at one or more of an inlet and/or outlet of a nozzle providing entry of a stream into a combustor, an inlet and/or outlet of a combustion chamber in a combustor, an outlet of the combustor, and an inlet and/or outlet of a turbine.

Figure 1:
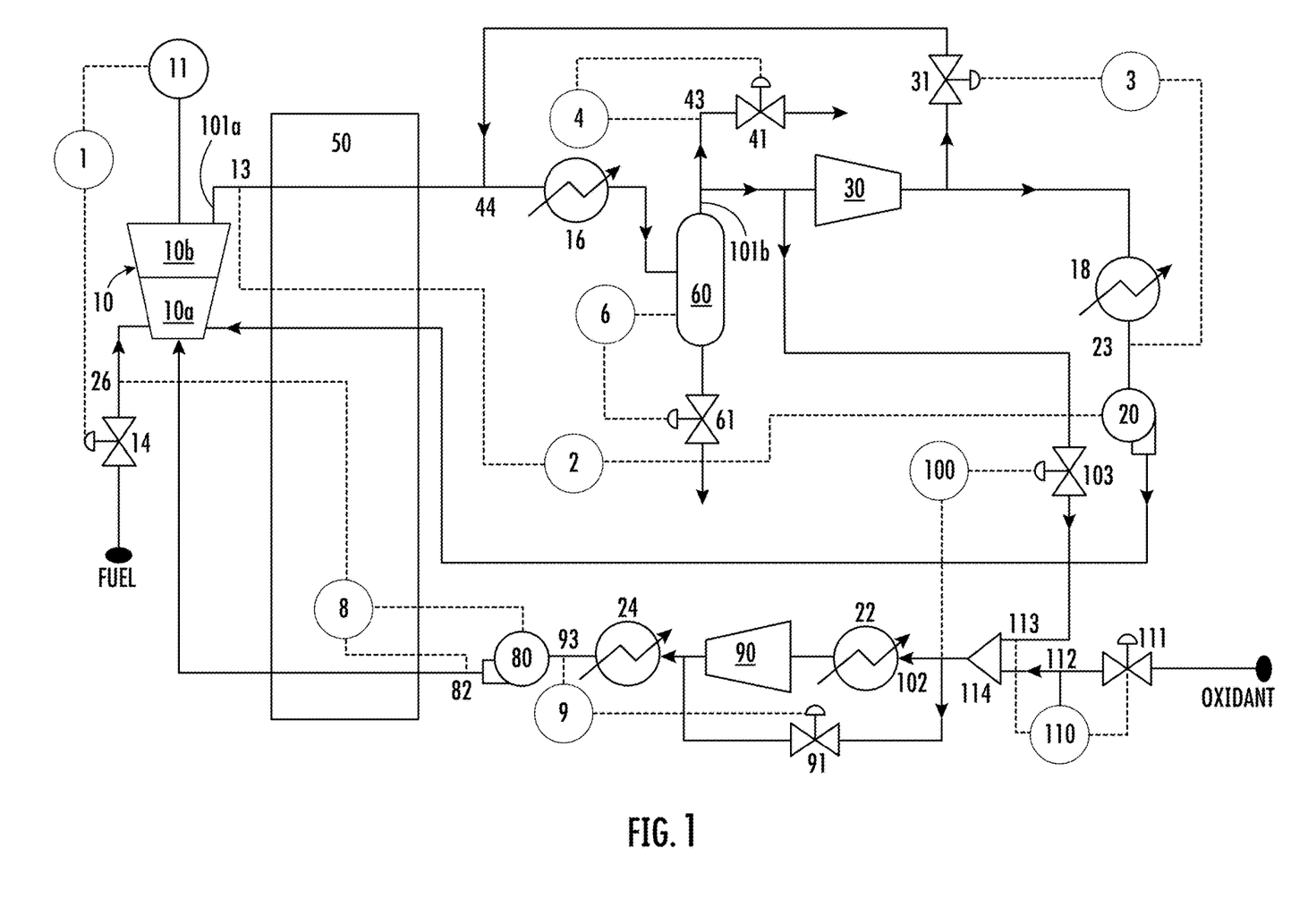
FIG. 1 illustrates a flow chart for a power production system including control elements suitable for carrying out a power production method.

Embodiments of the present disclosure are illustrated in FIG. 1, which illustrates a power production process including multiple control elements. The illustrated power production system with integrated control elements can be particularly useful for normalizing volumetric flow rates into the combustor. In this configuration, the power production system can be particularly useful where the cycle is a direct fired oxy-fuel cycle burning a carbonaceous fuel with oxygen. As illustrated, a working fluid is circulated through a combustor/turbine 10 including a combustion chamber 10a and a turbine section 10b connected to a generator 11, a first heater/cooler 16, a separator 60, a compressor 30, a second heater/cooler 18, and a pump 20. Optionally, a recuperator heat exchanger 50 can be included so that heat in the stream exiting the turbine 10b can be recuperated into the working fluid stream prior to passage back to the combustor/turbine 10.

Heat of combustion of a fuel with oxidant in the combustion chamber 10a is added to the working fluid, which is preferably at a high pressure (e.g., about 10 bar or greater, about 20 bar or greater, about 50 bar or greater, about 80 bar or greater, about 100 bar or greater, about 150 bar or greater, about 200 bar or greater, or about 250 bar or greater) to provide a high pressure, heated combustion product stream that passes to the turbine section 10b and is expanded to a lower pressure to exit as turbine exhaust stream 101a. Parameter check point 13 is configured downstream from the turbine 10b and upstream from the first heater/cooler 16 (and optionally upstream from the recuperator heat exchanger 50 if present) and includes a temperature sensor, thermocouple, or the like. Controller 2 (which can be characterized as a pump controller) directs and/or gathers one or more temperature readings (which readings can be continuous or periodic) at parameter check point 13. So as to maintain a substantially constant temperature at parameter check point 13, controller 2 directs power adjustments as necessary for pump 20. For example, controller 2 can control the speed of pump 20 in response to the temperature reading at parameter check point 13. In this manner, controller 2 can be configured to maintain a desired temperature in turbine exhaust stream 101a independent of the amount of heat that is being introduced into the system in the combustion chamber 10a, and likewise independent of the inlet temperature of turbine section 10b. This is beneficial in that pump 20 can be specifically controlled to deliver the correct mass flow of working fluid at the correct pressure as dictated by the inlet temperature to the turbine section 10b as indicated by the amount of heat introduced in the combustion chamber 10a.

Such dynamic control can affect one or more further parameters in the power production system illustrated in FIG. 1. For example, changes in the flow rate through pump 20 causes changes in the suction pressure immediately upstream from the pump. Second heater/cooler 18 can be useful to maintain the suction temperature at pump 20 at a desired value. So as to maintain a substantially constant suction pressure for pump 20, controller 3 (which can be characterized as a pump suction pressure controller) can be configured to monitor a pressure sensor, transducer, or the like positioned at parameter check point 23, and controller 3 can utilize pressure readings taken therefrom to control a spillback valve 31, which can be configured to allow more or less fluid from the $CO_2$ stream 101b downstream of compressor 30 to spill back to parameter check point 44, which can be at any position in the turbine exhaust stream 101a. Controller 3 thus essentially can be configured to control the amount of recirculation flow around compressor 30 via the spillback valve 31. As such, pressure at parameter check point 23 can be increased by reducing fluid flow through spillback valve 31 and can be decreased by increasing fluid flow through the spillback valve. As fluid is spilled back into the turbine exhaust stream 101a, it can also be desirable to maintain a substantially constant pressure in the turbine exhaust stream. Accordingly, parameter check point 13 can likewise include a pressure sensor, transducer, or the like. The temperature sensor and the pressure sensor can be configured in the same parameter check point, or different parameter check points can be utilized in the turbine exhaust stream 101a for the respective sensors.

Because parameter check point 13 is in fluid communication with parameter check point 44 and parameter check point 43, the respective pressures at points 13, 44, and 43 may differ substantially only due to inherent pressure losses through equipment and piping. Controller 4 can be configured to monitor a pressure sensor, transducer, or the like positioned at parameter check point 43, and controller 4 can be configured to control valve 41 so as to allow fluid from the $CO_2$ stream 101b into, or out of, the system in order to maintain a substantially constant pressure at parameter check point 44. As such, parameter check point 44 can include a pressure sensor, transducer, or the like, which can be monitored by controller 4 if desired. Valve 41 can be configured to remove and/or add fluid to the $CO_2$ stream 101b in order to maintain the desired pressure. In some embodiments, there can be two valves instead of the single valve 41—a first valve (i.e., a fluid outlet valve) configured to allow fluid out to a lower pressure sink, and a second valve (i.e., a fluid inlet valve) configured to allow fluid in from a higher pressure source.

In the illustrated system of FIG. 1, compressor 30 receives its inlet $CO_2$ stream from the separator 60, and its outlet $CO_2$ stream is delivered ultimately to the pump 20. The compressor 30 can be shaft-mounted on the turbine 10b, and the working conditions of the compressor may be substantially unchanged based on the control of the turbine exhaust conditions.

Although controller 2, controller 3, and controller 4 are illustrated and discussed as being separate controllers, it is understood that the respective controllers can be configured as part of a larger unit. For example, a single control unit may include a plurality of subunits that can be individually connected with their designated parameter check points and their controlled devices (e.g., the pump 20, the spillback valve 31, and the valve 41). Moreover, the control units can be configured substantially as subroutines in an overall controller (e.g., a computer or similar electronic device) with a plurality of inputs and a plurality of outputs that are designated for the respective parameter check points and controlled devices.

In embodiments wherein recuperative heat exchanger 50 is included, control of temperature at parameter check point 13 can be particularly important. By maintaining the temperature at parameter check point 13 at or substantially near a steady state value, the temperature profiles in the recuperative heat exchanger 50 can remain substantially constant as well. At a minimum, such control scheme is beneficial because of the reduction or elimination of thermal cycling of the piping, heat exchangers, and other high temperature equipment utilized in the system, which in turn can significantly increase component lifetimes.

Controller 1 (which can be characterized as a power controller) can be configured for monitoring a variety of values and directing a number of control commands. In one or more embodiments, controller 1 can be configured to measure and/or receive measurements in relation to the power output of generator 11. In some embodiments, controller 1 can be configured to direct heat input in the combustion chamber 10a to generate the required power by opening or closing valve 14. Thusly, if power output at generator 11 is above or below the desired output, heat input can be decreased or increased to deliver the desired power output. Similarly, monitoring of power output with controller 1 can enable dynamic changes to the heat input so that a substantially constant power output can be provided. As more or less heat is added to the system, the turbine inlet temperature will change and, after expansion through the turbine, the temperature at parameter check point 13 will change.

As noted above, the turbine exhaust stream 101a can be treated in water separator 60 where water can be taken off through valve 61. A $CO_2$ stream 101b exits the top of the separator 60 and is passed through compressor 30 (with a fraction being drawn off through valve 41. A compressed $CO_2$ stream exiting compressor 30 is passed through the second heater/cooler 18 and then pump 20 to provide a high pressure $CO_2$ stream, which can be passed back to the combustor/turbine 10 (optionally passing through the recuperator heat exchanger 50 to be heated with heat withdrawn from the turbine exhaust stream). As previously noted, the $CO_2$ stream 101b can be substantially pure $CO_2$ and thus can comprise at least 95% by weight, at least 97% by weight, at least 98% by weight, at least 99% by weight, or at least 99.5% by weight $CO_2$.

Controller 6 (which can be characterized as a water separator controller) is utilized to monitor water level in separator 60, which can include one or more sensors suitable for providing a water level output that can be read by controller 6. Based on the water level signal received, controller 6 can direct valve 61 to open at the correct intervals and durations to maintain the water level in the separator 60 at a desired level. Although measurement is referenced in relation to a water level, it is understood that volume, mass, or other parameters may be utilized to provide the signal to controller 6.

An oxidant for use in combusting fuel passed into the combustion chamber 10a can enter the system through valve 111 and pass through union 114, where $CO_2$ can be combined with the oxidant. This can be beneficial to dilute a substantially pure oxygen stream used as the initial oxidant source. If non-pure oxygen is used as the oxidant, $CO_2$ passing through valve 103 may be completely or partially eliminated. The oxidant stream (optionally diluted with the $CO_2$ stream) passes through heater/cooler 22, is pressurized in compressor 90, passes through heater/cooler 24, and is finally passed through pump 80. Controller 8 (which can be characterized as an oxidant pump controller) measures the ratio between the mass flow of the fuel (read at parameter check point 26) and the mass flow of the oxidant (read at parameter check point 82). Based upon the calculated ratio, controller 8 can direct variable speed pump 80 to change the power of the pump and allow the delivery of oxidant in the correct mass flow to maintain the desired oxidant to fuel ratio at the required pressure. This can provide one level of control to ensure that the amount of oxidant supplied to the power production system is consistently at the correct flow rate and correct pressure for passage into the dual combustor/turbine 10. If, for example, the pressure at parameter check point 82 were to rise due to back pressure from the combustor/turbine 10, controller 8 can be configured to command pump 80 to operate at a different speed suitable to provide the correct pressure and oxidant mass flow. Based upon a pressure reading taken at parameter check point 93, controller 9 (which can be characterized as an oxidant pressure controller) can direct spillback valve 91 to decrease or increase the pressure at parameter check point 93 by allowing more or less fluid to spill back (or be recycled) to a point upstream from the compressor 90 (particularly between union 114 and heater/cooler 22. Pressure likewise can be monitored at parameter check point 102 (which pressure corresponds to the suction of compressor 90). Based upon this pressure, controller 100 (which can be characterized as an oxidant pressure controller) can direct valve 103 to divert none or a portion of the fluid upstream of compressor 30 to union 114 so as to maintain a substantially constant pressure at parameter check point 102. The substantially pure $CO_2$ stream diverted through valve 103 can be utilized to dilute the oxidant, and controller 100 likewise can be configured to increase or decrease flow through valve 103 to provide the desired dilution. Mass flow of the $CO_2$ stream provided through valve 103 can be measured at parameter check point 113, and the mass flow of the oxidant provided through valve 111 can be measured at parameter check point 112. Controller 110 (which can be characterized as a dilution controller) can be configured to calculate the ratio of the flows at check points 112 and 113, and can be configured to direct valve 111 to allow more oxidant or less oxidant to enter the system so as ensure that the correct ratio is maintained.

In one or more embodiments, a control system according to the present disclosure can be configured to specifically provide for mass control across a wide range of pressures. Low pressure mass control (e.g., at ambient pressure to about 10 bar, to about 8 bar, or to about 5 bar) can be achieved similarly to the description of controller 4 above. In particular, controller 4 can be configured to open or close valve 41 to relieve excess mass from the power production system. For example, in a system utilizing a recycle $CO_2$ stream as a working fluid and combusting a fossil fuel, excess $CO_2$ can be formed. To maintain the correct mass balance in the system, all or a portion of the formed $CO_2$ can be drawn off through valve 41. The amount of fluid drawn though valve 41 for purposes of mass control can be calculated based upon the known stoichiometry of the combustion reaction, and controller 4 can be configured to control mass flow through valve 41 accordingly. If desired, one or more sensors can be utilized to measure and/or calculate fluid mass downstream from the combustor and/or to measure and/or calculate fluid mass ratio between a stream between the combustor and the valve 41 in relation to a stream that is downstream from the compressor 30 and/or the pump 20.

Control elements as described above for use in controlling elements of a power production plant are further described in U.S. Pat. No. 10,103,737 to Fetvedt et al., the disclosure of which is incorporated herein by reference. Control and other components and methods of operation of a power production plant as described therein may likewise be utilized according to the present disclosure.

Figure 2:
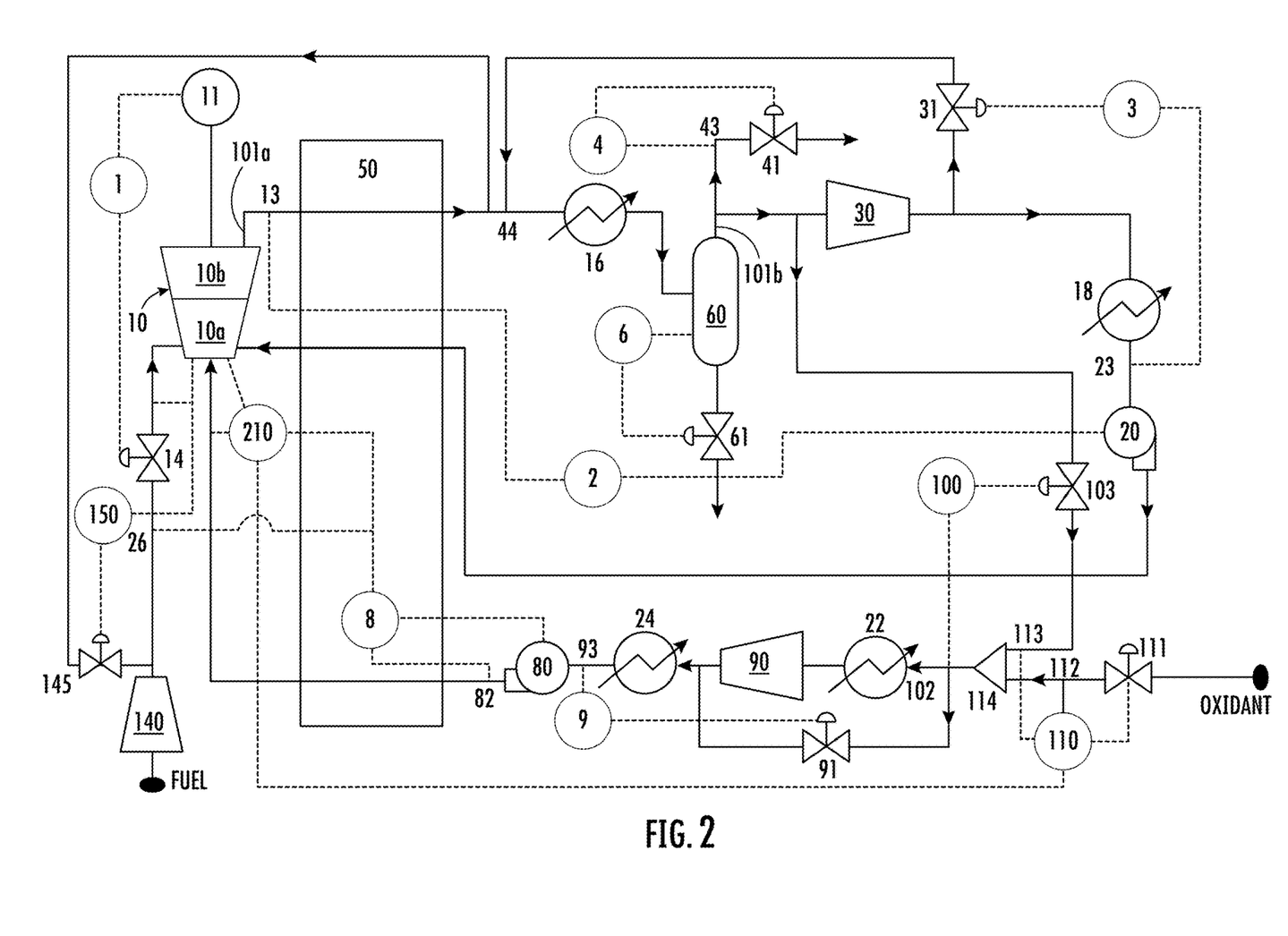
FIG. 2 illustrates a flow chart for an improved power production system including control elements suitable for carrying out a power production method according to the present disclosure.
Figure 3:
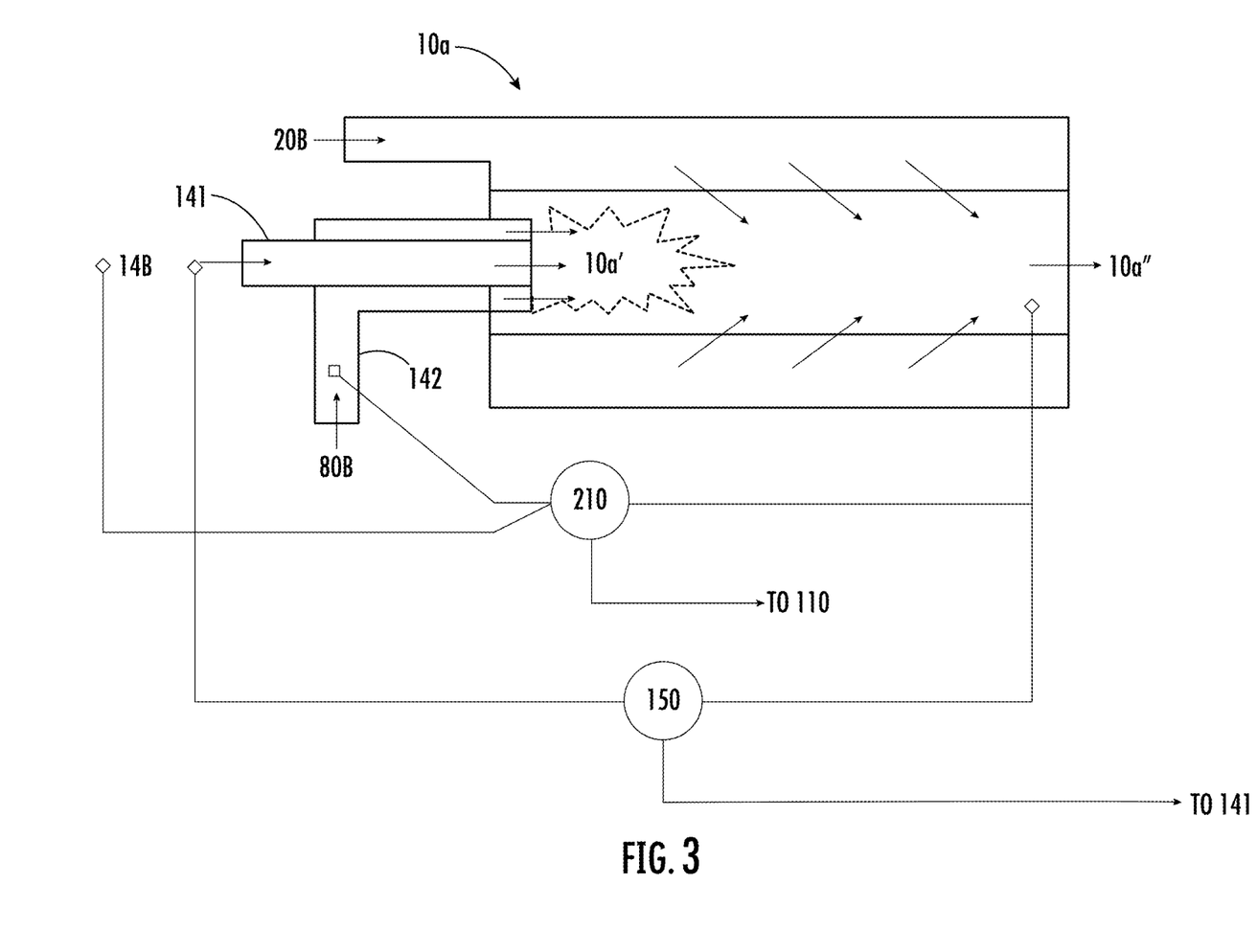
FIG. 3 illustrates a partial cross-sectional view of a combustor according to embodiments of the present disclosure including control elements for normalization of volumetric flows into and out of the combustor.

Additional control elements and system components that are useful according to the present disclosure are further illustrated in FIG. 2 and FIG. 3. In particular, the various elements shown therein can be effective for normalizing the velocity of the combustor exit stream (i.e., the turbine inlet stream) so that the velocity can remain substantially constant. As this volumetric flow rate between the combustor and the turbine that is directly downstream from the combustor cannot be easily measured, the present disclosure can utilize indirect methods for calculating combustor exhaust stream velocity based upon a plurality of inputs based upon measured flow rates and/or pressures of one or more streams, one or more constants, and computer calculations. The result is that the volumetric flow rate of a combustor inlet stream (e.g., one or both of the fuel stream and the oxidant stream) and/or a combustor exit stream can be adjusted as needed so that the volumetric flow rate between the combustor and a turbine immediately downstream from the combustor is controlled within a defined range without the requirement of a direct measurement of the volumetric flow rate between the combustor and the turbine immediately downstream from the combustor. The defined range of the volumetric flow rate between the combustor and the turbine can be such that the volumetric flow therebetween varies by no greater than 10%, no greater than 5%, no greater than 2%, no greater than 1%, or no greater than 0.5%.

The control elements thus provide for a method for controlling a volumetric flow rate of a combustor inlet and/or exit stream. In example embodiments, such method can comprise providing one or more signals to a controller, the one or more signals being indicative of one or more parameters of: one or more streams entering a combustor; an exhaust stream exiting the combustor; or one or more streams entering the combustor and an exhaust stream exiting the combustor. Using the signals that are input, the controller then can calculate a factor that is effective for adjusting the volumetric flow rate of the combustor inlet or exit stream. The calculated factor can be a variety of mathematical values that are implementable through instructions provided by the controller and that can be applied to one or more streams in the system. The calculated factor, for example, can be a ratio between the mass flows of two or more streams, a ratio between the volume flows of two or more streams, a differential between mass flows of two or more streams, a differential between volume flows of two or more streams, a differential between the pressures of two or more streams, a molar content of a moiety (e.g., $O_2$, $CO_2$, $CH_4$, etc.) present in a stream, and similar, mathematical values that can be utilized as a basis for a change in a parameter of one or more streams as described herein to achieve control of volumetric flow rate of a stream that is not otherwise directly measurable. The method therefore can result in outputting from the controller one or more output signals effective to implement the factor and adjust the volumetric flow rate of the combustor inlet and/or exit stream so that a volumetric flow rate between the combustor and a turbine immediately downstream from the combustor is controlled within a defined range without direct measurement of the volumetric flow rate between the combustor and the turbine immediately downstream from the combustor This can allow for an easier aero-design for the turbine as the operational point can be held substantially constant. More specifically, the present disclosure can provide the ability to control the chemistry of one or both of the fuel stream and the oxidant stream entering the combustor 10 in order to maintain a substantially constant (e.g., +/−10%, +/−5%, +/−2%, +/−1%, or +/−0.5%) combustor exhaust stream velocity and/or flow rate. Likewise, a combustor inlet stream velocity can be maintained to be substantially constant (e.g., +/−10%, +/−5%, +/−2%, +/−1%, or +/−0.5%) for some or all of the streams entering the combustor.

Controller 210 (which can be characterized as a combustor inlet flow controller) can be configured to receive signals from several sensors in the power production plant. For instance, in some embodiments, controller 210 can be configured to receive a signal corresponding to a mass flow of the fuel at point 14B immediately upstream of the combustor fuel inlet, such as at the combustor fuel nozzle 141. In some embodiments, controller 210 can be configured to receive a signal corresponding to a pressure of the combustor exhaust stream 10a" exiting the combustor prior to entry into the turbine 10b. In some embodiments, controller 210 can be configured to receive a signal corresponding to a pressure of the oxidant at point 80B immediately upstream of the combustor oxidant inlet, such as at the combustor oxidant nozzle 142. Controller 210 thus can utilize various sensor readings for carrying out calculations to determine one or more desired set-points that can be utilized for maintaining a substantially constant volumetric flow into the combustor 10a. Such set-points are examples of a factor that is calculated using the controller.

In some embodiments, controller 210 can be configured to perform one or more calculations for establishing a factor useful for normalizing volumetric flow of the oxidant into the combustor 10a. The calculations can incorporate one or more constants, such as the mass flow of the fuel stream at point 14B (e.g., as passing through the fuel nozzle 141) at full load conditions, and such as a pressure differential of the oxidant between point 80B (e.g., as passing through the oxidant nozzle 142) and point 10a" (i.e., the combustor exhaust stream outlet) at full load. The term "full load" or "full load operation" is understood to mean conditions wherein the combustor itself is operating at is maximum capacity and/or wherein a larger system (e.g., a power production system as otherwise described herein) is operating at its maximum capacity or rated maximum operating capacity. For example, when a power production system is rated for providing a maximum electrical energy output, operation of the power production system so as to deliver the maximum electrical energy output would be considered a full load operation. Controller 210 thus can utilize these values in a control function to determine a desired set-point for the difference between 80B and 10a", such as by the following calculation:

$$\Delta P_{Set-point} = f(P_{80B}, P_{10a''}, \Delta P_{Full\ Load}, \dot{m}_{14B}, \dot{m}_{14B\ @\ full\ load})$$

wherein $\Delta P_{Set-point}$ is the desired set-point for the difference between 80B and 10a", $P_{80B}$ is the measured pressure in nozzle 142, $P_{10a''}$ is the measured pressure of the combustor exhaust stream 10a", $\Delta P_{Full\ Load}$ is the difference in pressure between 80B and 10a" at full load, $\dot{m}_{14B}$ is the mass flow of the fuel stream at nozzle 141, $\dot{m}_{14B\ @\ full\ load}$ is the mass flow of the fuel stream at nozzle 141 at full load.

Controller 210 can receive pressure inputs to enable measurement of the difference between the oxidant pressure at 80B and the combustor exhaust stream pressure at 10a" to determine the process value for comparison to the set-point. The controller output from 210 can be sent to controller 110 to be used as a new set-point. Such set-point is an example of a factor that is calculated using the controller, the calculated factor being an implementable instruction that is effective for adjusting the volumetric flow rate of the oxidant stream into the combustor.

In this manner, one factor that can be calculated is a factor useful for adjusting the ratio of $O_2$ to $CO_2$ in an oxidant stream to be passed to the combustor. For example, with reference to FIG. 2, the factor can be used specifically so that the ratio of $O_2$ to $CO_2$ at point 102 can be adjusted as necessary. It is understood, however, that the adjustment can be made relative to the oxidant stream at any point upstream from the combustor but downstream from a point wherein $CO_2$ may be input to the oxidant stream. In performing this control based on the function of measureable parameters, the volumetric flow of stream 80B leaving the oxidant nozzle and entering the combustion zone 10a' is substantially constant (e.g., +/−10%, +/−5%, +/−2%, +/−1%, or +/−0.5%). This is highly beneficial to the stability of the combustion zone/flame zone 10a'. In addition, it may be desired to modify the volumetric flow of the oxidant stream at point 80B as it enters the combustion zone/flame zone 10a', and modification of the function used by controller 210 can enable such level of control.

Other signals or inputs from further sensors can be delivered to controller 210 for inclusion in the control function. This may allow for modification of the pressure drop through the oxidant nozzle 142 to change the volumetric flow entering combustion zone/flame zone 10a' based on operational characteristics and desired flow given the current operational point.

In one or more embodiments, control functions can be additionally, or alternatively, utilized for providing similar controls over the fuel volumetric flow into the combustor 10a, such as normalizing volumetric flow of fuel into the combustor. For example, controller 150 can be configured to receive a signal corresponding to a pressure of the combustor exhaust stream 10a", and controller 150 likewise can be configured to receive a signal corresponding to a pressure of the fuel stream at point 14B (e.g., as entering and/or passing through the fuel nozzle 141) in order to calculate the pressure drop through the fuel nozzle. These values, and potential other parameters, can be used by controller 150 to determine a set-point for the pressure drop through the fuel nozzle 141, such as by using the following calculation:

$$\Delta P_{Set-point} = f(P_{14B}, P_{10a''}, \Delta P_{Full\ Load})$$

wherein $\Delta P_{Set-point}$ is the desired set-point for the difference between 14B and 10a", $P_{14B}$ is the measured pressure in nozzle 141, $P_{10a''}$ is the measured pressure of the combustor exhaust stream 10a", $\Delta P_{Full\ Load}$ is the difference in pressure between 14B and 10a" at full load An output from controller 150 thus can be used to control valve 145, which adds $CO_2$ to the fuel line as a diluent. As shown in FIG. 2, the $CO_2$ may be added from line 101a as taken from a point between an outlet of the turbine 10b and an inlet of the water separator 60, preferably between the heat exchanger 50 and the water separator. Alternatively, the $CO_2$ may be taken from line 101b at a point between the pump 20 and the inlet of the combustor 10a or an inlet to the heat exchanger 50 and added to the fuel line downstream of compressor 140. In FIG. 2, this is shown as being added between the compressor 140 and the valve 14, but it is understood that the stream may be added between valve 14 and the combustor 10a (i.e., upstream of valve 14 or downstream of valve 14). Likewise, rather than being input downstream of the compressor 140, the input to the fuel line may be upstream of the compressor 140 with the recognition that it is useful to input the $CO_2$ at a pressure similar from which it is taken (e.g., input upstream from compressor 140 if taken upstream from the compressor 30 and/or the pump 20 but input downstream from the compressor 140 if taken downstream from the pump 20). This addition of $CO_2$ has the impact of changing the Wobbe index of the fuel, which is counter to conventional teaching and applications as this forces a change in control valve 14 in order to maintain a given power level. The ratio of $CO_2$ to fuel in the fuel stream is an example of a further factor that can be effective for adjusting the volumetric flow rate of a stream into the combustor. As with the oxidant stream, the added control functions can be effective to maintain a substantially constant (e.g., +/−10%, +/−5%, +/−2%, +/−1%, or +/−0.5%) volumetric flow rate of the fuel when it enters the combustion zone 10a' from the fuel nozzle 141. Similarly, other parameters and sensor inputs can be included in the function in order to control the amount of $CO_2$ added to the fuel to impact the volumetric flow rate when it enters the combustion zone. In this manner, the characteristics and the impact on the flame zone can be controlled and manipulated to achieve a desired outcome.

Many modifications and other embodiments of the presently disclosed subject matter will come to mind to one skilled in the art to which this subject matter pertains having the benefit of the teachings presented in the foregoing descriptions and the associated drawings. Therefore, it is to be understood that the present disclosure is not to be limited to the specific embodiments described herein and that modifications and other embodiments are intended to be included within the scope of the appended claims. Although specific terms are employed herein, they are used in a generic and descriptive sense only and not for purposes of limitation.

The invention claimed is:

1. A method for power production, the method comprising:
    passing a plurality of streams into a combustor so that a fuel is combusted with an oxidant in the combustor in the presence of a carbon dioxide diluent to form a combustor exhaust stream;
    expanding the combustor exhaust stream in a turbine to generate power at a desired output and provide a turbine exhaust stream;
    processing the turbine exhaust stream to isolate carbon dioxide therefrom and provide the carbon dioxide diluent;
    calculating a factor effective for normalizing a total volumetric flow rate of the plurality of streams into the combustor, such that the total volumetric flow rate varies by no more than 10% as the desired output of power generated by the turbine increases or decreases; and
    modifying a chemistry of at least one of the plurality of streams passing into the combustor as the desired output of power generated by the turbine increases or decreases based on the calculated factor effective for normalizing the total volumetric flow rate-of the plurality of streams into the combustor.

2. The method of claim 1, wherein modifying the chemistry of the at least one of the plurality of streams passing into the combustor includes inputting to a controller one or more control inputs indicative of the increase or decrease in the desired output of power generated by the turbine.

3. The method of claim 1, wherein passing the plurality of streams into the combustor includes passing a fuel stream into the combustor, and wherein modifying the chemistry of the at least one of the plurality of streams passing into the combustor includes inputting to a controller a signal corresponding to a mass flow of the fuel stream at a point that is immediately upstream of an inlet of the fuel stream to the combustor.

4. The method of claim 3, wherein modifying the chemistry of the at least one of the plurality of streams passing into the combustor includes outputting from the controller a signal effective to increase or decrease a flow of the carbon dioxide diluent into the fuel stream upstream from the combustor.

5. The method of claim 1, wherein passing the plurality of streams into the combustor includes passing an oxidant stream into the combustor, and wherein modifying the chemistry of the at least one of the plurality of streams passing into the combustor includes inputting to a controller a signal corresponding to a pressure of the oxidant stream at a point that is immediately upstream of an inlet of the oxidant stream to the combustor.

6. The method of claim 5, wherein modifying the chemistry of the at least one of the plurality of streams passing into the combustor includes outputting from the controller a signal effective to increase or decrease a flow of the carbon dioxide diluent into the oxidant stream upstream from the combustor.

\* \* \* \* \*